Patented Nov. 3, 1936

2,059,579

UNITED STATES PATENT OFFICE 2,059,579

PRODUCTION OF SULPHUR DYES

Raymond W. Hess, Buffalo, N. Y., assignor to National Aniline & Chemical Company, Inc., New York, N. Y., a corporation of New York No Drawing. Application September 25, 1929, Serial No. 395,205

18 Claims. (Cl. 260—21)

This invention relates to a process for the production of sulphur dyes, more particularly to black sulphur dyes, and includes correlated improvements and discoveries whereby and wherewith the production of such dyes is enhanced.

An object of the invention is to provide a process for the production of black sulphur dyes which simplifies and renders their production on a commercial scale more economical.

An additional object of the invention is to provide a process for the production of black sulphur dyes by treating a nitrophenol with a polysulphide compound in a plurality of stages rather than in a single stage.

Further objects of the invention are to provide a process for the production of black sulphur dyes in accordance with which the shade of the resulting dye may be controlled, thus producing a variety of shades of black, and more particularly a duller shade having marked covering power.

Other objects of the invention will in part be obvious and will in part appear hereinafter.

In the production of black sulphur dyes from nitrophenols as ordinarily carried out, a definite quantity of an alkali metal polysulphide is mixed with a definite quantity of a nitrophenol, and the reaction mass is then heated until the reaction is completed. However, instead of using a nitrophenol directly, the practice sometimes is first to heat the corresponding nitrochlorbenzene with caustic alkali to produce the alkali metal nitrophenolate through removal of the chlorine atom by hydrolysis, and then to heat the resulting nitrophenolate with an alkali metal polysulphide as above described.

Previously these alkali metal polysulphide fusions have been carried out in only one stage with reference to the quantity of sulphur used, the full quantity of sulphur being incorporated into the melt at one time at the beginning of the fusion and before reaction with the nitrophenol. The dye thus obtained has limited tinctorial value and dyes textile fibres relatively bright shades of black. This process, wherein the total sulphur content of the melt is present at the beginning of the heating, will hereinafter be referred to as the "one stage process" to more clearly distinguish the present invention.

The invention accordingly comprises the several steps and the relation of one or more of such steps with respect to each of the others thereof, which will be exemplified in the process hereinafter disclosed, and the scope of the invention will be indicated in the claims.

In the practice according to the present invention, the process may be controlled so as to give dyes which yield relatively dull shades of black of high tinctorial value. This may be accomplished by carrying out the reaction in two or more stages with reference to the sulphur content of the reacting mass. In the first stage, the intermediate, e. g., the nitrophenol, may be heated with a quantity of a sulphide the sulphur ratio of which, expressed in the formula $Na_2S_x$, is lower than that used in the later stage or stages.

The total quantity, and the sulphur ratio, of the polysulphide used preferably correspond to that which will produce the dye more or less completely precipitated out of solution. In the first stage of the reaction, sodium sulphide, an alkali metal polysulphide, hydrogen sulphide, sodium sulphydrate, ammonium sulphide and other sulphides of the alkali or alkali earth metals may be employed. Account must be taken, however, of the ratio of sulphide to the nitrophenol, and of its composition, used in the first stage in calculating the ratio and composition of sulphide to be used in the second stage.

The proportion of sulphur to be employed in the first stage will depend upon the results desired. In general, the lower the ratio of sulphur present at this stage to the total sulphur employed in the process, the greater will be the tinctorial value of the dye and the duller will be the shades produced therefrom. Further, a longer time of heating during the first stage ordinarily results in the production of dyes which give dyeings of duller shades of black than are produced by a shorter time of heating at this stage.

The polysulphide may be prepared by dissolving sulphur in sodium sulphide solution or it may be prepared preferably by dissolving sulphur in aqueous caustic alkali. When prepared in the latter manner, the total free sulphur employed may be charged in two or more stages. A part of the total free sulphur may be added in a first stage, and after the intermediate has undergone a preliminary reaction with the sulphide, the remainder of the free sulphur may be added.

As illustrative embodiments of a manner in which the invention may be practiced the following examples are presented. The parts are by weight.

*Example 1.*—21.6 parts of 2.4-dinitrochlorbenzene, 9.3 parts of caustic soda and 100 parts of hot water are mixed and heated under reflux until the dinitrochlorbenzene has been substantially completely hydrolyzed and converted into the corresponding sodium dinitrophenolate.

7.1 parts of 2.4.6-trinitrophenol are then added to the mixture, the quantity of caustic soda present being sufficient to form the sodium salt. To the hot well-stirred mixture, there is gradually added a solution of 27 parts sodium sulphide (60%) dissolved in an equal weight of water.

After all the sulphide has been added, stirring is continued for a short time to ensure complete reaction. Sulphuric acid of 50 per cent strength is then added to neutralize the excess alkali, about 28 parts being required. To the reaction mass, there is added a polysulphide solution corresponding to .76 mol. $Na_2S_{6.7}$ per mol. of mixed nitrophenols. The polysulphide is prepared by dissolving 26 parts free sulphur in 27 parts caustic soda liquor containing 46.7% NaOH. This reaction mixture is then heated under a reflux and the heating is continued for a short time after all of the intermediate has disappeared.

The resulting dye is obtained mostly in the form of a precipitate and it may be isolated by any suitable and desirable method, as for example, by blowing the reaction mass with air, and filtering, whereby the total dye may be obtained.

The total quantity of free sulphur, sulfide, and alkali used in this example gives a total of 2.28 mols $Na_2S_{2.92}$ per mol. of mixed nitrophenols; but in the present process the same result is not obtained as would be obtained in the "one stage process" by the use of 2.28 mols of $Na_2S_{2.92}$ per mol. of nitrophenols. The dyes produced by the present process give dyeings of duller shades and of greater covering power than those given by a dye made by the "one stage process".

*Example 2.*—A mixture of 19.5 parts of dinitrochlorbenzene and 19.8 parts caustic soda liquor containing 47.2% caustic soda are heated with 100 parts water until a clear solution is obtained. 9.5 parts of trinitrophenol are then added and the solution neutralized with sulphuric acid of 50 per cent strength. A polysulphide solution corresponding to 1.76 mols $Na_2S_3$ per mol. of mixed nitrophenols is prepared from 61.5 parts of caustic soda liquor containing 47.2% NaOH and 31.1 parts of sulphur, and cooled to about 40° to 50° C. The solution of the nitrophenols is then added thereto and the mixture gently refluxed for one hour. At the end of this period 7.6 parts of sulphur are added and refluxing is continued until a short time after the intermediate has disappeared. The dye produced may be isolated in the usual way. The total polysulphide employed theoretically corresponds to 1.76 mols of a polysulphide of the formula $Na_2S_4$ per mol. of mixed nitrophenols. The dyeings from the dye thus produced are duller in shade and have greater covering power than those produced from a dye made by the "one stage process" using 1.76 mols of $Na_2S_4$.

When the reaction of Example 2 is carried out by longer heating in the first stage, the dye produced gives still duller shades of black.

It is to be understood that the invention is not limited to the specific materials, the amounts thereof, or to the specific mode of operation described in the foregoing examples. Thus, for example, instead of heating a nitrochlorbenzene with caustic alkali to remove the chlorine atom by hydrolysis, the nitrophenol per se, or its alkali metal salt, may be used as the starting material. Further, the mixture of nitrophenols above described may be displaced by dinitrophenol or trinitrophenol, or other nitrohydroxy compounds, as dinitrohydroxy - diphenylamines, either alone or in admixture. Other substances also may be used, such as the corresponding amino phenols and substituted nitrophenols, either alone or in admixture. The reaction may be also carried out in a closed vessel under pressure.

Furthermore, a polysulphide may be prepared by dissolving the necessary quantity of free sulphur in sodium sulphide, and instead of adding free sulphur to the reaction mass to increase its sulphur content, the necessary quantity of polysulphide having a higher sulphur content may be added. Sulphides of alkali metals other than sodium, or of alkali earth metals, may be used in the polysulphide composition.

The invention, of course, is not limited to the use of the particular polysulphides specified in the above examples, nor to the amounts therein given. Thus, where the total sulphur to be used corresponds to a polysulphide of the formula $Na_2S_5$, the first stage may be carried out using $Na_2S_3$, and the second stage with the required quantity of higher polysulphide. Further, the step of neutralization with sulphuric acid may be omitted, but account should be taken of the alkalinity of the reaction mass in the subsequent stage of the fusion.

Where in the specification and claims the words "a sulphide" is used it is intended to generically include both mono- and poly-sulphides unless expressly limited to the mono- or to the polysulphide. Where the expression "heating in two stages" is used in describing the present invention, it is used with reference to the proportions of sulphur. It will be further understood that the term "a nitrophenol body" as used in the claims is intended to define generically a nitrophenol in the free state and a nitrophenol in the form of an alkali metal salt.

Since certain changes may be made in carrying out the above process without departing from the scope of the invention, it is intended that all matter contained in the above description shall be interpreted as illustrative and not in a limiting sense.

I claim:

1. A process for the production of sulphur dyes which comprises heating a nitrophenol body with an alkali metal sulphide until preliminary reaction takes place, then mixing therewith a higher alkali metal polysulphide to increase the sulphur content of the reaction mass, and heating until reaction is completed.

2. A process for the production of sulphur dyes which comprises heating a nitrophenol body with a sodium sulphide until preliminary reaction takes place, then mixing therewith a higher sodium polysulphide to increase the sulphur content of the reaction mass, and heating until reaction is completed.

3. A process for the production of sulphur dyes which comprises heating 2.4-dinitrophenol with about 1.7 mols of sodium trisulphide per mol. of nitrophenol, then adding about 1.7 atomic proportions of free sulphur per mol. of nitrophenol originally present and heating until reaction is completed.

4. A process for the production of sulphur dyes which comprises heating a mixture of nitrophenol bodies containing 2.4-dinitrophenol with 1.76 mols of a sodium sulphide, corresponding to the formula $Na_2S_3$ per mol. of mixed nitrophenols, until a preliminary reaction take place, then increasing the sulphur content of the reaction mass and the sulphur ratio of the sodium sulphide, and heating until reaction is completed.

5. A process for the production of sulphur dyes which comprises heating a mixture of 19.5 parts dinitrochlorbenzene with 9.3 parts caustic soda until hydrolysis is substantially complete, adding 9.5 parts trinitrophenol, neutralizing excess caustic, admixing with a sulphide prepared from 29.0 parts caustic soda and 31.1 parts free sulphur and heating until a preliminary reaction takes place, then adding 7.6 parts free sulphur and heating until reaction is completed.

6. A process for the production of sulphur dyes which comprises reacting a nitrophenol body with an alkali metal polysulphide in two stages, the sulphur ratio of the sulphide in the first stage being lower than in the second stage.

7. In the production of a black sulphur dye by heating a nitrophenol body with an alkali metal polysulphide, the improvement which comprises heating the nitrophenol body with an alkali metal sulphide in which the ratio of sulphur to alkali metal is less than that required to produce the black sulphur dye, then adding sulphur in an amount corresponding to said deficiency, and heating the resulting reaction mixture to produce said dye.

8. In the production of a black sulphur dye by heating a nitrophenol body with a sodium polysulphide, the improvement which comprises heating the nitrophenol body with a sodium polysulphide in which the ratio of sulphur to sodium is less than that required to produce the black sulphur dye, then adding a sodium polysulphide of a higher sulphur ratio in an amount corresponding to said deficiency, and heating the resulting reaction mixture to produce said dye.

9. In the production of a black sulphur dye by heating a nitrophenol body with a sodium polysulphide in aqueous solution, the improvement which comprises heating the nitrophenol body with a sodium polysulphide in which the ratio of sulphur to sodium is less than that required to produce the black sulphur dye, the amount of said sodium polysulphide being less than that which will produce the dye substantially completely precipitated out of solution, then increasing the sulphur content of the reaction mixture and the sulphur ratio of the alkali metal polysulphide in amounts corresponding to said deficiencies, and heating the resulting reaction mixture to produce said dye.

10. A process for the production of sulphur dyes, which comprises heating a phenol body containing a nitro group with a polysulphide in two stages, the first stage being carried out in the presence of an alkali-metal polysulphide of lower sulphur ratio than that required to carry out the process as a one stage process and the second stage being carried out in the presence of an alkali-metal polysulphide containing sufficient sulphur to provide the needed sulphur ratio.

11. A process for the production of sulphur dyes, which comprises heating a phenol body containing a nitro group with an alkali-metal polysulphide having a lower sulphur to metal ratio than required for complete thionation, then increasing the sulphur to metal ratio of polysulphide present and heating until the thionation is completed.

12. In the production of a sulphur dye by reacting a nitro-phenol body with a polysulphide, the improvement which comprises effecting the reaction in a plurality of stages and substantially increasing the sulphur to metal ratio of the polysulphide between the first and last stages of the process.

13. A process for the production of a sulphur dye in two stages, which comprises reacting in the first stage a phenol body containing a nitro group with an alkali-metal polysulphide having a sulphur to alkali-metal ratio around that corresponding to the formula $Na_2S_3$, then increasing the sulphur to alkali-metal ratio to substantially above that of the polysulphide present at the end of said first stage, and in the second stage heating the mixture containing said polysulphide of increased sulphur to metal ratio until reaction is completed.

14. In the production of a sulphur black dye from phenol containing at least one nitro substituent, the improvement which comprises heating the phenol with a sodium polysulphide having a sulphur to sodium ratio of about that corresponding to the formula $Na_2S_3$, so as to effect reaction thereof, then increasing the sulphur to sodium ratio substantially above that at the end of said reaction, and further heating until thionation is completed and the sulphur black dye is formed.

15. In the production of a sulphur black dye from a phenol of the group consisting of dinitrophenol and trinitrophenol by reaction of a polysulphide thereon, the improvement which comprises effecting the reaction in a plurality of stages and substantially increasing the ratio of sulphur to sodium in polysulphide between the first and last stages.

16. In the production of a black sulphur dye by heating a nitrophenol body with an alkali metal polysulphide, the improvement which comprises heating the nitrophenol body with an alkali metal sulphide in which the ratio of sulphur to alkali metal is less than that required to produce the black sulphur dye, neutralizing the alkalinity of the resultant reaction mixture, then mixing therewith a polysulphide having the required ratio to produce the black sulphur dye, and heating the resultant reaction mixture to produce said dye.

17. The method of producing a black sulphur dye, which comprises heating a solution of sodium dinitrophenolate and sodium trinitrophenolate, the quantity of dinitrophenolate present being substantially larger than that of the trinitrophenolate present, with a sodium sulphide, the sulphur to sodium ratio of which is less than required in carrying out the fusion by a one stage process, and then heating the reaction product with an alkali metal polysulphide having a sulphur to alkali metal ratio sufficient to make up the deficiency.

18. The method of producing a black sulphur dye, which comprises reacting a solution of sodium 2,4-dinitrophenolate and sodium 2,4,6-trinitrophenolate, the quantity of dinitrophenolate present being substantially greater than the quantity of trinitrophenolate present, with a sodium polysulphide having a sulphur to sodium ratio around that corresponding to the formula $Na_2S_3$, and after the reaction is substantially complete heating the reaction mixture with a sodium polysulphide having a sulphur to alkali metal ratio substantially above that of the polysulphide present at the end of the first reaction.

RAYMOND W. HESS.